Jan. 24, 1956      A. E. WILLIAMS      2,732,003
INERTIA LOCK FOR TILTING AUTO SEATS
Filed Jan. 28, 1953
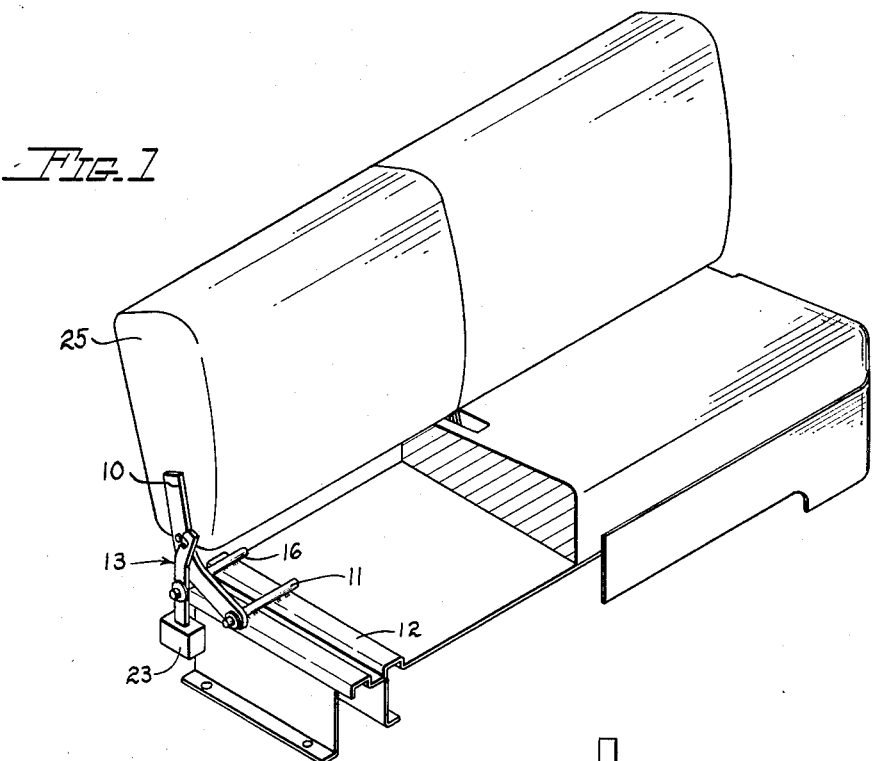
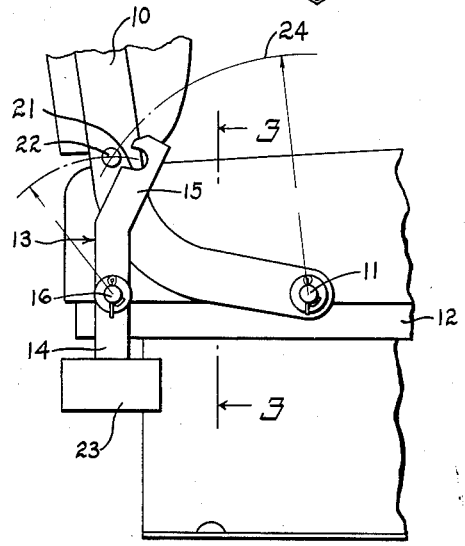
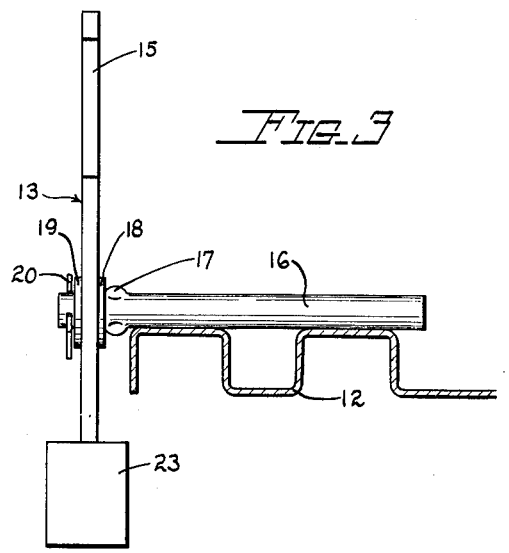
ALBERT E. WILLIAMS
INVENTOR.
BY *Hubert Miller*

United States Patent Office 2,732,003
Patented Jan. 24, 1956

2,732,003

INERTIA LOCK FOR TILTING AUTO SEATS

Albert E. Williams, Wichita, Kans., assignor to General Motors Corporation, Detroit, Mich., a corporation of Delaware Application January 28, 1953, Serial No. 333,651

7 Claims. (Cl. 155—5)

This invention relates to a seat lock which is normally inoperative, and which is locked automatically by the force of inertia.

A large percentage of automobiles in present use have a forward tilting seat back on the seat immediately to the right of the driver's seat, to afford access to the rear seat. Such tilting seat backs are often responsible for collision accidents being more serious than they otherwise would be, because when impact occurs the force of inertia causes the hinged seat back to tilt forward. Simultaneously the occupant of the aligned rear seat is thrown forward against the tilting seat back, which presents no resistance to his forward movement. As a consequence, the occupant of the tilting seat is thrown forward, not only as a result of the force of inertia acting on his own body, but also as a result of the additional force of inertia acting on the rear seat passenger and on the tilting seat back. Consequently both the front and rear seat occupants are both often injured much more seriously than they would be if the seat back was fixed, or locked against forward tilting.

It is the primary object of this invention to reduce injuries from collision accidents by providing an inertia lock for tilting seat backs—a lock which permits the seat back to be tilted in the usual way for access to the rear seat, yet which locks and positively prevents the hinged seat back from tilting when the forward progress of the car is suddenly stopped or momentarily arrested.

It is a further object to provide a lock for the stated purpose which is actuated by the force of inertia, and is only actuated by sudden stoppage in the forward progress of the car, and not by the normal application of brakes.

Still another object is to provide a lock of the stated type which can be installed on presently operating cars with only a very minor modification of the seat proper, and which can be easily built into new cars during their manufacture without necessitating the redesign of the seat.

The invention, together with other objects, will be more clearly understood when the following description is read in connection with the accompanying drawing, in which:

Fig. 1 is a perspective view of an inertia lock embodying the invention, installed on a conventional automobile seat, a portion of the seat bottom having been removed for clarity;

Fig. 2 is an enlarged side view of the lock illustrating the geometrical movement of the lock and seat back, the seat being shown fragmentarily; and Fig. 3 is a front view of the lock illustrating the manner of installing it on a conventional seat support, and showing further details in construction.

In the following description and in the drawing like numerals indicate like parts.

As will be seen in Fig. 1, the seat back supporting bracket 10 is hinged on a shaft 11 which is welded to the metal seat base 12. A pendulum type lock is designated as a whole by the numeral 13. This lock is in the form of a heavy gage elongate plate 14 having its upper end 15 offset at an angle to its remaining portion. Plate 14 is pivotally mounted intermediate its ends on a lateral shaft 16 which is rigidly secured, as by welding, to the seat base 12. Lugs 17 (Fig. 3), washers 18 and 19, and a cotter key 20 restrict the movement of the plate 14 to a single plane.

The aft edge of the upper end 15 of plate 14 is recessed, as indicated at 21, to form a hook which is adapted to receive and hold a laterally projecting pin 22 rigidly carried by bracket 10, when the lock 13 is pivoted counter-clockwise.

To increase its mass, the lower end of plate 14 carries a weight 23 which serves through gravity to normally maintain the entire pendulum lock 13 in the position shown in Fig. 2.

*Operation*

Referring particularly to Fig. 2, it will be understood that when the automobile on which the lock is installed is at rest or is being driven in a normal manner, weight 23 holds plate 14 in such a position that pin 22 is free to move along the indicated arm 24, with shaft 11 as a center. The entire seat back 25 may thus be tilted forward at will.

In case of a collision, or in case the vehicle brakes are applied firmly to avoid a collision, inertia forces cause weight 23 to pivot plate 14 counter-clockwise. Hook end 15 of the lock simultaneously engages and holds pin 22 against movement along its normal path of travel. Bracket 10 and consequently seat back 25 are thus locked against forward tilting movement. With the vehicle stopped and inertia forces spent, weight 23 immediately pivots plate 14 clockwise to its normal position, simultaneously freeing seat back 25 for forward tilting movement.

From the above description it will be seen that the invention provides a simple, inexpensive, yet practical automatic lock for tilting seat backs; one which will materially reduce injuries to car occupants in case of collision or other sudden stoppage of the car travel.

Having described the invention with sufficient clarity to enable those familiar with this art to construct and use it, I claim:

1. In a vehicle seat having a forward tilting seat back which is hinged on a lateral axis to fixed vehicle structure, a gravity released inertia engaged seat back locking mechanism comprising: a pendulum pivoted intermediate its ends on vehicle structure and freely swingable by inertia forces; and integral means carried by said pendulum normally un-engaged with said seat back and engageable therewith to maintain it against forward tilting movement when said pendulum is swung by inertia forces as a result of sudden interruption in the forward travel of the vehicle.

2. In a vehicle seat having a forward tilting seat back which is hinged on a lateral axis to fixed vehicle structure, an inertia actuated mechanism for locking said back against forward tilting movement comprising: an inertia actuated pendulum pivotally mounted on fixed vehicle structure; and seat back engaging and locking means carried by said pendulum in a position normally outside the path of travel of said back, and in a location to engage said back at a point spaced from its hinge point and to thus lock the back against tilting movement when said pendulum is swung as a result of sudden interruption in the forward travel of the vehicle.

3. In a vehicle seat having a forward tilting back rigidly secured to and supported by at least one side bracket which is hinged on a lateral axis to fixed vehicle structure, an inertia actuated mechanism for locking said back against forward tilting movement comprising: a rigid pin rigidly secured to said bracket at a location spaced from the bracket hinge point and extending laterally outward from the bracket; a pendulum pivotally mounted on fixed vehicle structure; and pin engaging and locking means carried by said pendulum in a position normally outside the path of travel of said pin, whereby said bracket may freely pivot about its hinge point when the vehicle is at rest and while it is being operated normally, and said pin is engaged by said locking means and said bracket is thereby locked against movement when said pendulum is swung as a result of sudden interruption in the forward travel of the vehicle.

4. In a vehicle seat having a seat back supporting bracket at one side hinged on a lateral axis to a fixed seat bottom support, an inertia actuated automatic lock for locking said seat back against movement with relation to said seat bottom comprising: a rigid pin rigidly secured to said bracket at a location spaced from the hinge point of the bracket, and extending laterally outward from the bracket; a rigid free swinging pendulum pivotally mounted on said support to swing in a plane common to the plane in which said pin is located; a hook integrally carried by the upper end of said pendulum opening toward and in a location to engage said pin when the lower end of the pendulum swings forward; and a weight fixed on the lower end of said pendulum and constituting an inertia means for swinging the lower end of said pendulum forward and the upper end thereof in a pin engaging direction when the forward travel of the vehicle is suddenly interrupted, whereby to lock said seat back supporting bracket, and consequently the seat back, against forward movement about the bracket hinge point.

5. In a vehicle, a seat comprising a cushion base member, a tiltable back member pivotally mounted on said cushion base member, and means associated with one of said members engageable with the other of said members in response to deceleration of said vehicle for preventing tilting of said back member.

6. In a vehicle, a seat mechanism comprising a cushion structure, a tiltable back structure pivotally mounted on said cushion structure, a swingable latch member pivoted on said cushion structure, and a projection formed on said back structure, said latch being swingable in response to deceleration of said vehicle to engage said projection for preventing tilting movement of said back structure.

7. In a vehicle, a seat mechanism comprising a cushion assembly mounted on a support, a tiltable back having depending arms pivotally engaging said cushion assembly, a projection formed on at least one of said depending arms, and a latch member pivotally mounted on said cushion assembly and swingably engageable with said projection in response to deceleration of said vehicle, said latch member being out of engagement with said projection when said vehicle is stationary.

References Cited in the file of this patent

UNITED STATES PATENTS

| | | |
|---|---|---|
| 1,747,329 | Smith | Feb. 18, 1930 |
| 1,952,376 | Knabusch et al. | Nov. 27, 1934 |
| 2,477,155 | Vincent | July 26, 1949 |
| 2,499,993 | Gregg | Mar. 7, 1950 |
| 2,557,313 | Quilter | June 19, 1951 |
| 2,559,548 | Seigneur | July 3, 1951 |
| 2,588,914 | Dunham | Mar. 11, 1952 |
| 2,624,613 | Parmely | Jan. 6, 1953 |

FOREIGN PATENTS

| | | |
|---|---|---|
| 8,449 | Great Britain | 1890 |